US012036587B2

(12) United States Patent
Sivacoe

(10) Patent No.: US 12,036,587 B2
(45) Date of Patent: Jul. 16, 2024

(54) PIG PUMPING UNIT

(71) Applicant: Luisa Anne Sivacoe, Lacombe (CA)

(72) Inventor: Orlande Sivacoe, Lacombe (CA)

(73) Assignee: Luisa Anne Sivacoe, Lacombe (CA)

( * ) Notice: Subject to any disclaimer, the term of this patent is extended or adjusted under 35 U.S.C. 154(b) by 0 days.

(21) Appl. No.: 18/105,793

(22) Filed: Feb. 3, 2023

(65) Prior Publication Data

US 2023/0182180 A1 Jun. 15, 2023

Related U.S. Application Data

(63) Continuation of application No. 17/497,972, filed on Oct. 10, 2021, now Pat. No. 11,596,987, which is a continuation of application No. 16/329,646, filed as application No. PCT/CA2017/051037 on Sep. 1, 2017, now Pat. No. 11,154,917.

(30) Foreign Application Priority Data

Sep. 1, 2016 (CA) ................................ CA 2940924

(51) Int. Cl.
*B08B 9/055* (2006.01)
*F15B 1/00* (2006.01)

(52) U.S. Cl.
CPC .............. *B08B 9/0551* (2013.01); *F15B 1/00* (2013.01)

(58) Field of Classification Search
None
See application file for complete search history.

(56) References Cited

U.S. PATENT DOCUMENTS

| | | | |
|---|---|---|---|
| 2,282,143 | A | 5/1942 | Carter |
| 3,212,116 | A | 10/1965 | Gentry |
| 3,883,431 | A | 5/1975 | Ishii et al. |
| 4,203,712 | A | 5/1980 | Uehara |
| 4,724,007 | A | 2/1988 | Barry et al. |
| 5,018,544 | A | 5/1991 | Boisture et al. |
| 5,150,493 | A | 9/1992 | Sivacoe |
| 5,195,479 | A | 3/1993 | Hasetoh et al. |
| 5,265,302 | A | 11/1993 | Sivacoe |
| 5,358,573 | A | 10/1994 | Sivacoe |
| 5,379,475 | A | 1/1995 | Sivacoe |
| 5,431,545 | A | 7/1995 | Knight et al. |
| 5,685,041 | A | 11/1997 | Sivacoe |
| 5,752,810 | A | 5/1998 | Hein |
| 5,783,256 | A | 7/1998 | Matsuda et al. |
| 5,927,901 | A | 7/1999 | Graves |

(Continued)

FOREIGN PATENT DOCUMENTS

| | | | |
|---|---|---|---|
| CA | 2590980 | A1 | 12/2008 |
| CN | 103511217 | A | 1/2014 |
| EP | 0877165 | A2 | 11/1998 |

OTHER PUBLICATIONS

From www.jbj.co.uk/splittergearboxes.html: Splitter Gearboxes/ Multiple Power Take-Off Units; Aug. 8, 2016, pp. 1-3.

(Continued)

*Primary Examiner* — Levon J Shahinian
(74) *Attorney, Agent, or Firm* — Burdick Patents, P.A.; Sean D. Burdick

(57) ABSTRACT

A pig pumping unit is provided that allows eight passes to be made simultaneously with a single pumping unit. A single engine is used to drive three or four pumps, each connected into separate pumping units. Two engines may thus be used to drive up to eight pumps in a single trailer.

2 Claims, 5 Drawing Sheets

(56) References Cited

U.S. PATENT DOCUMENTS

| | | | |
|---|---|---|---|
| 5,951,248 | A | 9/1999 | Hall |
| 6,170,493 | B1 | 1/2001 | Sivacoe |
| 6,289,878 | B1 | 9/2001 | Blass |
| 6,359,645 | B1 | 3/2002 | Sivacoe |
| 6,367,572 | B1 | 4/2002 | Maletschek et al. |
| 7,836,964 | B2 | 11/2010 | Groonwald et al. |
| 9,296,025 | B2 | 3/2016 | Sivacoe |
| 2008/0223410 | A1 | 9/2008 | Molloy et al. |
| 2010/0051061 | A1 | 3/2010 | Guillon |
| 2016/0207081 | A1 | 7/2016 | Sivacoe |

OTHER PUBLICATIONS

Information pamphlet of JBJ Technologies Limited: Pump Drives; pp. 1-42 (Nov. 2019).

PIG PUMPING UNIT

CROSS REFERENCE TO RELATED APPLICATIONS

This application is a continuation of and claims priority to U.S. patent application Ser. No. 17/497,972 that was filed on Oct. 10, 2021, which is a continuation of and claims priority to U.S. patent application Ser. No. 16/329,646 that was filed on Feb. 28, 2019, which is the National Stage entry of PCT/CA2017/051037, filed Sep. 1, 2017, which claims priority to Canadian Application No. 2,940,924, filed Sep. 1, 2016, all of which are fully incorporated herein by reference.

FIELD

Pig pumping units.

BACKGROUND

Oil refineries frequently include many kilometers of pipes that require cleaning, as for example in fired heaters, where oil is heated during the refining process. One well established cleaning technique is to run a pig through the pipes under hydraulic pressure to clean the pipes. Pigs are typically polyurethane or strangulated foam cylinders or balls that are studded with scraping elements. The inventor has been a pioneer in the art of pigging, and has obtained U.S. Pat. No. 6,569,255 for a Pig and method for cleaning tubes, U.S. Pat. No. 6,391,121 for a Pig and method for cleaning tubes, U.S. Pat. No. 6,359,255 for a Pipe inspection device and method, U.S. Pat. No. 6,170,493 for a Method of cleaning a heater, U.S. Pat. No. 5,685,041 for a Pipe pig with abrasive exterior, U.S. Pat. No. 5,379,475 for a Scraper for a Pipe Pig, U.S. Pat. No. 5,358,573 fora Method of cleaning a pipe with a cylindrical pipe pig having pins in the central portion, U.S. Pat. No. 5,318,074 for a Plug for a furnace header, U.S. Pat. No. 5,265,302 for a Pipeline Pig and U.S. Pat. No. 5,150,493 for a Pipeline Pig.

The inventor's own U.S. Pat. No. 9,296,025 provides a pumping unit which allows at least four passes to be made simultaneously with a single pumping unit. A single engine is used to drive two pumps, each connected into separate pumping circuits. Fluid flow in each of the pumping circuits is controlled by respective flow control elements on the pumping circuits, as for example a variable flow valve. Operation of the pumping unit requires an operator for each engine (two people) plus a person to handle the pigs, a total of three workers.

It is highly desirable to be able to do a required amount of pumping with a pig pumping unit on a single trailer. Space on a trailer is highly constrained. Water pumps take up space, and in order to receive adequate head of water at the water pumps' suction, the water pumps should be located at a low height in the trailer. These space and positioning constraints make it difficult to power multiple pumps per engine.

SUMMARY

A pig pumping unit is provided that has at least a first engine; a first gearbox and a second gearbox, the first gearbox connected to the first engine, the second gearbox connected to and driven by the first gearbox; at least a first pump, a second pump and a third pump, the first gearbox connected to the first pump and the second gearbox connected to drive the second pump and third pump; one or more clean water tanks; one or more dirty water tanks; and at least a first pumping circuit fluidly connected to the first pump, a second pumping circuit fluidly connected to the second pump and a third pumping circuit fluidly connected to the third pump, wherein each pumping circuit is fluidly connected to the clean water tank and dirty water tank.

In a further embodiment, a pig pumping unit is provided that has at least a first engine; a first gearbox connected to the first engine; at least a first pump, a second pump and a third pump connected to and driven by the first gearbox; one or more clean water tanks; one or more dirty water tanks; and at least a first pumping circuit fluidly connected to the first pump, a second pumping circuit fluidly connected to the second pump and a third pumping circuit fluidly connected to the third pump, wherein each pumping circuit is fluidly connected to the clean water tank and dirty water tank.

In various embodiments, there may be include any of the following features: a fourth pump connected to and driven by the second gearbox, and a fourth pumping unit fluidly connected to the fourth pump and fluidly connected to the clean water and dirty water tank; at least a second engine, a third gearbox and a fourth gearbox, the third gearbox connected to the second engine, the fourth gearbox connected to and driven by the third gearbox, at least a fourth pump, a fifth pump and a sixth pump, the third gearbox connected to drive the fourth pump and the fourth gearbox connected to drive the fifth pump and sixth pump, and at least a fourth pumping circuit fluidly connected to the fourth pump, a second pumping circuit fluidly connected to the fifth pump and a sixth pumping circuit fluidly connected to the sixth pump, wherein each pumping circuit is fluidly connected to the clean water tank and dirty water tank; a seventh pump connected to and driven by the second gearbox, and a seventh pumping circuit fluidly connected to the seventh pump, wherein the seventh pumping circuit is fluidly connected to the clean water tank and dirty water tank; an eighth pump connected to and driven by the fourth gearbox, and an eighth pumping circuit fluidly connected to the eighth pump, wherein the eighth pumping circuit is fluidly connected to the clean water tank and dirty water tank; a fourth pump connected to and driven by the first gearbox, and a fourth pumping unit fluidly connected to the first pump and fluidly connected to the clean water and dirty water tank; at least a second engine, a second gearbox connected to the second engine, at least a fourth pump, a fifth pump and a sixth pump connected to and driven by the second gearbox, and at least a fourth pumping circuit fluidly connected to the fourth pump, a fifth pumping circuit fluidly connected to the fifth pump and a sixth pumping circuit fluidly connected to the sixth pump, wherein each pumping circuit is fluidly connected to the clean water tank and dirty water tank; a seventh pump connected to and driven by the second gearbox, and a seventh pumping circuit fluidly connected to the seventh pump, wherein the seventh pumping circuit is fluidly connected to the clean water tank and dirty water tank; an eighth pump connected to and driven by the fourth gearbox, and an eight pumping circuit fluidly connected to the eighth pump, wherein the eighth pumping circuit is fluidly connected to the clean water tank and dirty water tank.

There is also provided a pig pumping unit that has at least a first engine, one or more clean water tanks, one or more dirty water tanks, and plural hydraulic pumping units connected to the first engine. Each of the plural hydraulic pumping units may have a hydraulic pump connecting to the first engine to be driven by the first engine, a hydraulic circuit connected to the hydraulic pump to be driven by the hydraulic pump, a hydraulic motor connected to the hydraulic circuit to be driven by the hydraulic circuit, a water pump connected to the hydraulic motor to be driven by the respective motor; and a pumping circuit fluidly connected to the water pump, the pumping circuit fluidly connected to the clean water tank and dirty water tank.

In various embodiments, there may be provided any one or more of the following features: there may be at least a second engine, and additional plural hydraulic pumping units connected to the second engine, the additional plural hydraulic pumping units being as described above, but with the hydraulic pump of each being connected to the second engine instead of the first engine. Each hydraulic circuit may have a bypass valve connected to it and configured to be responsive to a control signal to partially or wholly bypass the hydraulic motor connected to that hydraulic circuit. Each hydraulic motor may be connected to the water pump of the same hydraulic pumping unit via a respective gearbox. The plural hydraulic pumping units connected to the first engine, or to each engine if there are plural engines, may number for example 2, 3, 4, 5 or 6 hydraulic pumping units.

These and other aspects of the device and method are set out in the claims.

BRIEF DESCRIPTION OF THE FIGURES

Embodiments will now be described with reference to the figures, in which like reference characters denote like elements, by way of example, and in which.

DETAILED DESCRIPTION

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

A pig pumping unit is usually carried on the trailer of a tractor-trailer unit. In a conventional pumping unit, the engine compartment is typically located over the wheels of the trailer with a fuel tank and operator cabin at the other end, and clean and dirty water tanks in between.

A first set of embodiments of a pig pumping unit uses gearboxes to redirect the mechanical energy of an engine to the water pumps so that they may be located low on the trailer and still all be connected to receive mechanical energy from the engine.

Figure 1:
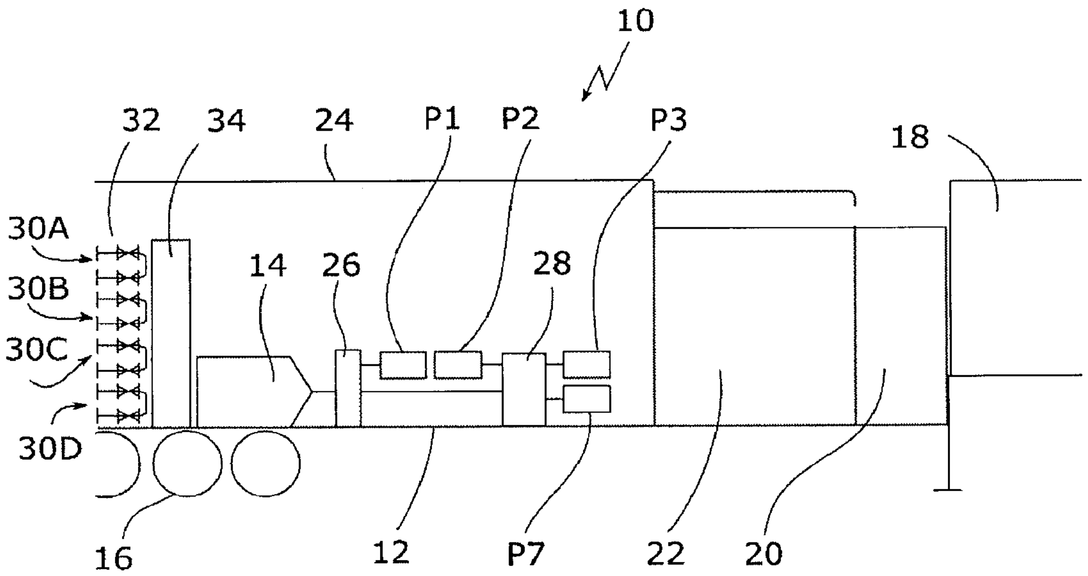
FIG. 1 is a right side schematic view of an embodiment of a eight pass pig pumping unit.

As shown in FIG. 1, in an embodiment of a pumping unit 10 is carried on the trailer 12 of a tractor-trailer unit. A first engine 14 is located over the wheels 16 of the trailer 12. At the opposite end of the trailer 12 is the operator's cabin 18, with a dirty water tank 20 and clean water tank 22 lying between the operator's cabin 18 and the engine compartment 24. The tanks 20, 22 are lower in height than the operator's cabin 18 and are easily visible from windows in the operator's cabin. The tanks 20, 22 may be made of several interconnected tanks and need not be a single unit.

The first engine 14 is connected to a first gearbox 26 and a second gearbox 28 is connected to and driven by the first gearbox 26 for example by a drive shaft. At least three pumps P1-P3 are driven by the first engine 14 using the gearboxes. A first pump P1 is connected to and driven by the first gearbox 26, and the second gearbox 28 is a splitter gearbox which allows the second gearbox 28 to drive the second pump P2 and third pump P3. Water from the clean water tank 20 may be supplied into a water bank from which clean water is pumped by the pumps P1-P3 for use as a pig drive fluid. First pump P1 is fluidly connected to first pumping circuit 30A, second pump P2 is fluidly connected to second pumping circuit 30B, and third pump P2 is fluidly connected to second pumping circuit 30C. The first pumping circuit 30A may be fluidly connected to a first pipe to be cleaned, the second pumping circuit 30B may be fluidly connected to a second pipe to be cleaned and the third pumping circuit 30C may be fluidly connected to a second pipe to be cleaned. Thus, three pipes may be cleaned using a single engine.

The operation and configuration of the valved pumping circuits 30A, 30B, 30C may be for example as described in the inventor's own patent, U.S. Pat. No. 9,296,025 B2. Valve banks 32 may be stacked in the trailer 12 near first engine 14. Bypass valves and flow meters may be stacked between each section of valve banks 32.

The pumping unit 10 may include a radiator 34 to cool the interior of the trailer 12.

Figure 2:
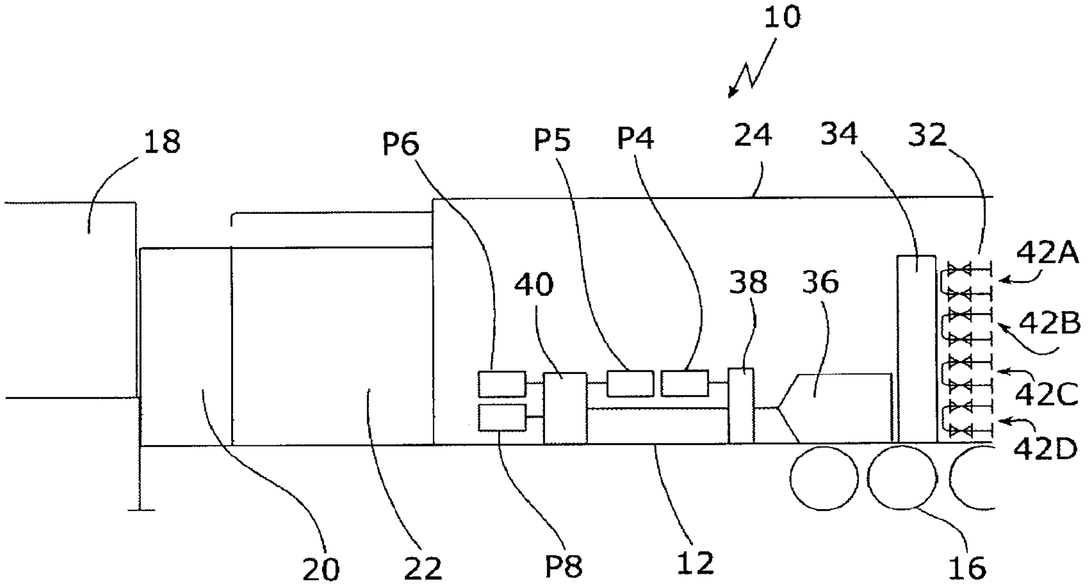
FIG. 2 is a left side schematic view of an embodiment of an eight pass pig pumping unit.

As shown in FIG. 2, the pumping unit 10 may include a second engine 36. A third gearbox 38 may be connected to the second engine 36 and a fourth gearbox 40 may be connected to and driven by the third gearbox 38. A fourth pump P4, a fifth pump P5 and a sixth pump P6 may be driven by the gearboxes, such that the third gearbox 38 may be connected to drive the fourth pump P4 and the fourth gearbox 40 may be connected to drive the fifth pump P5 and sixth pump P6. A fourth pumping circuit 42A may be fluidly connected to the fourth pump P4, a second pumping circuit 42B may be fluidly connected to the fifth pump P5 and a sixth pumping circuit 42C may be fluidly connected to the sixth pump P6, wherein each pumping circuit is fluidly connected to the clean water tank 20 and dirty water tank 22.

In an embodiment, a seventh pump P7 may also be connected to and driven by the second gearbox 28, and controlled in the same way as pumps P2 and P3. In a further embodiment, an eighth pump P8 may be connected to and driven by the fourth gearbox 40, and controlled in the same way as pumps P5 and P6. Each of seventh pump P7 and eighth pump P8 may be fluidly connected to its respective pumping circuit 30D and 42D and through its pumping circuit to the clean water tank 20 and dirty water tank 22.

Thus, a single trailer may hold a 6 pump pumping unit or an 8 pump pumping unit, also known as a six pass pumping unit and an eight pass pumping unit. Two engines and 8 pumps may be used in conjunction with the dirty water tank and the clean water tank to clean up to eight pipes at once. Pumps may be disengaged from and reconnected to the engines 14 and 36 to allow anywhere between 1 and 8 passes to be performed using the pumping unit 10 at any given time. Thus, the pig pumping unit 10 allows eight passes to be performed at once, and reduces the amount of equipment used in a large pigging operation, including by reducing the number of engines, water tanks, trailers and personnel required.

Figure 3:
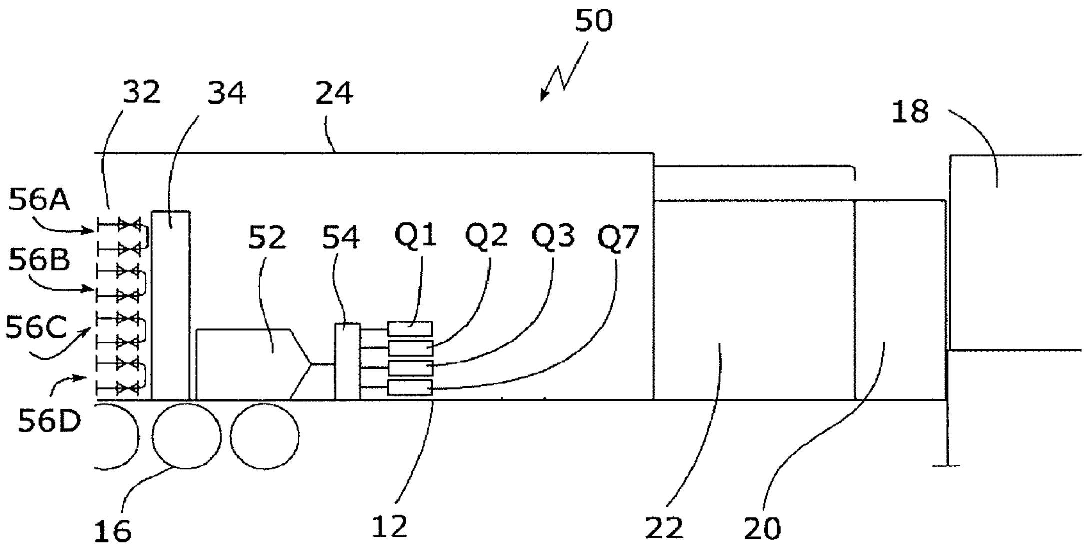
FIG. 3 is a right side schematic view of an embodiment of an eight pass pig pumping unit.

In an alternative embodiment, as shown in FIG. 3, a pig pumping unit 50 has a first engine 52 and a first gearbox 54 connected to the first engine 52. The first gearbox 54 is connected to at least a first pump Q1, second pump Q2 and third pump Q3, and each of the pumps Q1-Q3 are driven by the first gearbox 54. A first pumping circuit 56A is fluidly connected to the first pump Q1, a second pumping circuit 56B is fluidly connected to the second pump Q2, a third pumping circuit 56C is fluidly connected to the third pump Q3, and each pumping circuit is fluidly connected to a clean water tank 58 and dirty water tank 60. An additional pump Q7 may also be driven by the first gearbox 54, and connected to the first gearbox 54 and controlled in the same way as pumps Q1, Q2 and Q3. A pig pumping unit may thus have a single engine and still be able to perform four passes, i.e. clean four different pipes using a single engine simultaneously.

Figure 4:
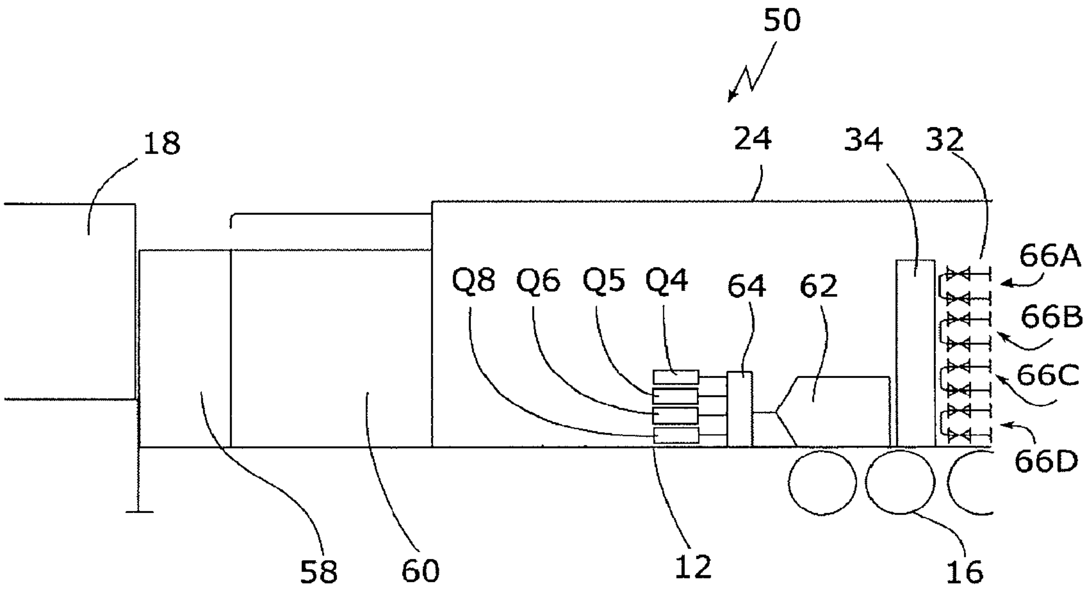
FIG. 4 is a left side schematic view of an embodiment of a eight pass pig pumping unit.

As shown in FIG. 4, an additional engine 62 may be included in the pig pumping unit 50 in order to increase the number of pumps available, while still containing the pig pumping unit 50 in a single trailer having a clean water tank 58 and dirty water tank 60. The second engine 62 may be connected to a second gearbox 64, and the second gearbox 64 may connect to and drive a fourth pump Q4, a fifth pump Q5 and a sixth pump Q6. A third pumping circuit 66A is fluidly connected to the fourth pump Q4, a fifth pumping circuit 66B is fluidly connected to the fifth pump Q5, a sixth pumping circuit 66D is fluidly connected to the sixth pump Q6, and each pumping circuit 66A, 66B, 66C is fluidly connected to a clean water tank 58 and dirty water tank 60.

In an embodiment, a seventh pump Q7 may also be driven by the first gearbox 54, and connected to the first gearbox 54 and controlled in the same way as pumps Q1, Q2 and Q3. In a further embodiment, an eighth pump Q8 may be connected to and driven by the second gearbox 64, and controlled in the same way as pumps Q4, Q5 and Q6. Seventh pump Q7 and eighth pump Q8 may be connected to respective pumping circuits 56D and 66D and through respective pumping circuits to the clean water tank 58 and dirty water tank 60. Thus, a single trailer may hold a six pass pumping unit and an eight pass pumping unit, while only having two engines, a single clean water tank 58 and dirty water tank 60, and a single gearbox for each engine.

Each gearbox may drive pumps using a take-off for each pump. A clutch located between each engine and gearbox may control the transmission of power and motion between the engine and gearbox. Between each gearbox and respective pumps there may be levers to move the meshing gears of the respective gearboxes for disengaging each of the pumps from respective gearboxes. The gearboxes may act as speed increasers to drive each of the pumps at a faster rate than would be possible with an engine alone. For example, if the engine runs at 2100 rpm, the pumps may run at 4600 rpm. Where a second gearbox is driven by first gearbox, the second gearbox may further increase the speed of pumps driven by the second gearbox as compared to the speed of pumps driven by the first gearbox.

The engines may be any suitable engine, such as a diesel engine used for powering heavy duty machinery, an example being a Caterpillar C15™ engine, and the pumps may be any pump suitable for use in a pig pumping unit.

Other clutch and drive shaft configurations may be used to configure a single engine to drive three or four pumps.

Each pumping circuit in operation may be connected to a different pipe, and the pipe is cleaned using the pumping of fluid through the pumping circuit and through the pipes using the pumps. As disclosed in the inventor's own prior patents, pipes may be cleaned by running pigs through specific sections repeatedly by reversing flow using the valve banks 32 etc. as operated by the operators. Flow bypass and diversion may also be accomplished by the operators in conventional manner. Location of the pigs may be determined from the pressure recorders. As the pigs pass bends in the pipes being cleaned, the pressure spikes, which is observable to the operator. When to switch from flowing return fluid to the clean water tank or the dirty water tank may be determined by visual inspection by the operator looking out of the window of the operator's cabin 18 at the flow of water from the return conduits.

A single operator may manage four pipes being cleaned at a time, so that two operators in a pumping unit having eight pumps may manage eight pipes being cleaned at a time. A single pig handler may be used for four pumping circuits, so that the total staff required to perform eight passes at a time is 4 and only a single trailer is required.

Hydraulic Embodiments

Additional embodiments may drive the water pumps using hydraulic motors powered by hydraulic pumps. The hydraulic pumps may be smaller than the water pumps, the the hydraulic circuits they power may be smaller in cross section than the suctions and outputs of the water pumps, and do not need to be located at a low height. Thus, they can be positioned much more flexibly than the water pumps, and in particular, multiple hydraulic pumps can be positioned to be driven mechanically by a single engine much more easily than multiple water pumps.

Figure 5:
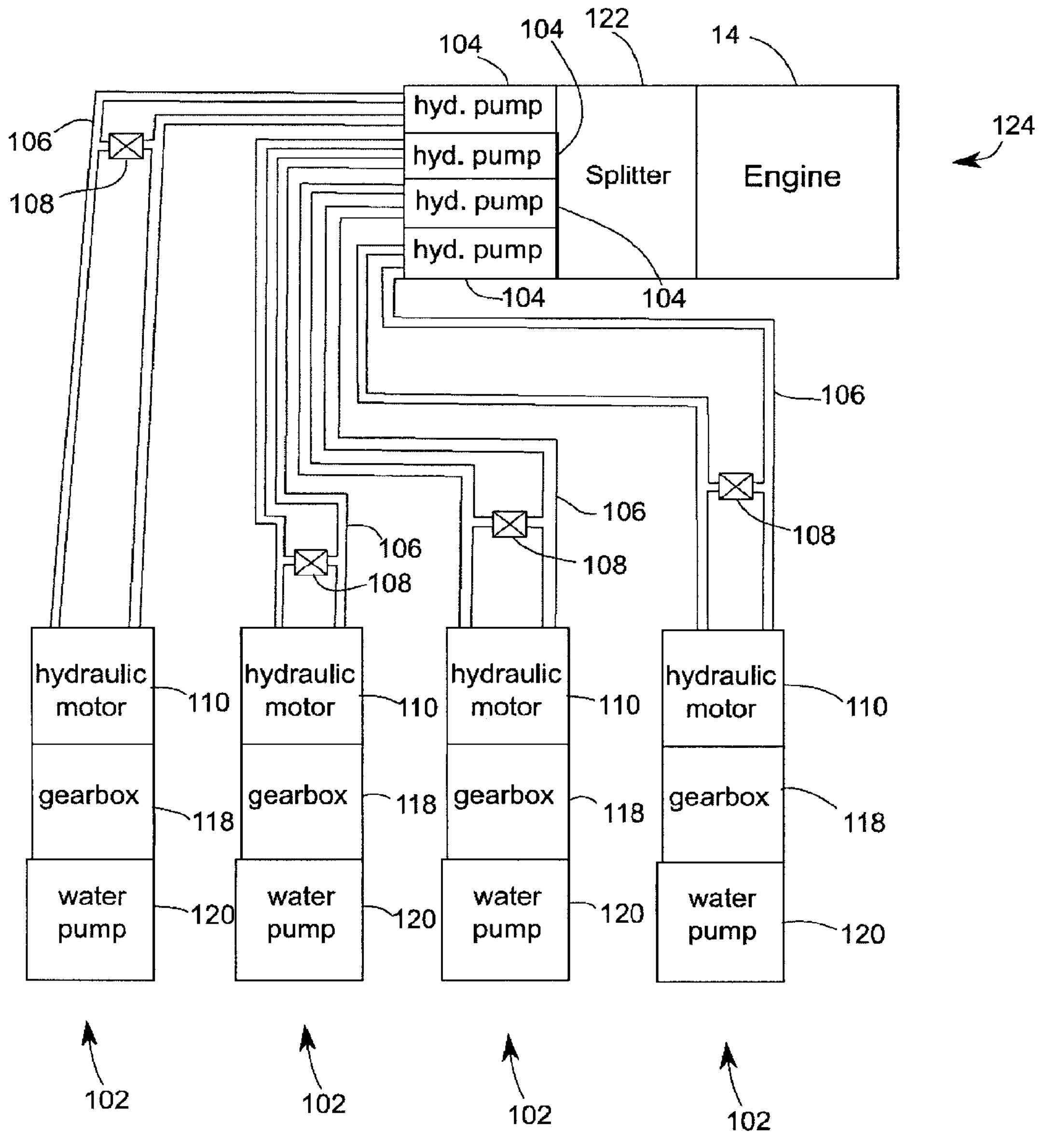
FIG. 5 is a schematic diagram showing a multiple pumps powered by a single engine using a hydraulic system.

FIG. 5 is a schematic diagram showing multiple water pumps powered by a single engine 14. This is a schematic diagram only and is intended to show only relationships between components, not sizes, shapes or positions. The diagram shows multiple hydraulic pumping units 102 powered by a single engine 14, each of the multiple hydraulic pumping units comprising a respective hydraulic pump 104 (shown with boxes labeled "hyd. pump"), respective hydraulic circuit 106, respective bypass valve 108, respective hydraulic motor 110, respective gearbox 118, and respective water pump 120. The engine 14 is connected to drive the hydraulic pumps via a mechanical splitter 122 which splits the mechanical energy of the engine. The hydraulic pumps 104 may each operate at the same rpm which may also be an rpm of the engine 14, for example 1800 rpm. The splitter 122 may also be a gearbox if desired, and may allow the hydraulic pumps to operate at a different rpm than the engine. The hydraulic pumps may be positioned flexibly, and so an arrangement of gearboxes as disclosed in the first set of embodiments is not needed, although such an arrangement could be used. The hydraulic pumps drive hydraulic fluid through respective circuits 106. The respective hydraulic motors 110 are connected to the respective hydraulic circuits 106 to be driven by the hydraulic power in the circuits. On each circuit a bypass valve 108 controllably bypasses the respective hydraulic motor in response to a control signal, e.g. from a control operated by an operator in operator's cabin 18. This allows the hydraulic motors, and hence the water pumps, to be individually controlled. The respective gearbox 118 may adjust the rpm between the hydraulic motors and the water pump. The respective gearbox 118 is not needed if the hydraulic motors 110 operate at a suitable rpm for the water pumps 120, for example in an embodiment 4600 rpm. The engine 14, splitter 122 and hydraulic pumps 104 may all be proximately located and may be considered together as a drive unit 124 for the purpose of later figures. The embodiment shown has 4 hydraulic pumping units 102 for one engine, but any number of hydraulic pumping units 102 may be used so long as the engine has enough horsepower to power all of them. For example, there may be 2, 3, 4, 5 or 6 hydraulic pumping units per engine.

Figure 6:
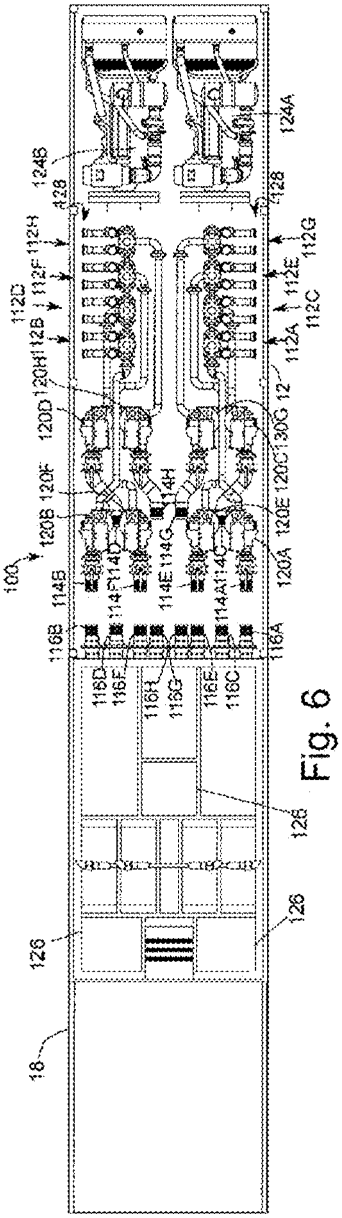
FIG. 6 is a top view of an embodiment of a hydraulic pig pumping unit.
Figure 7:
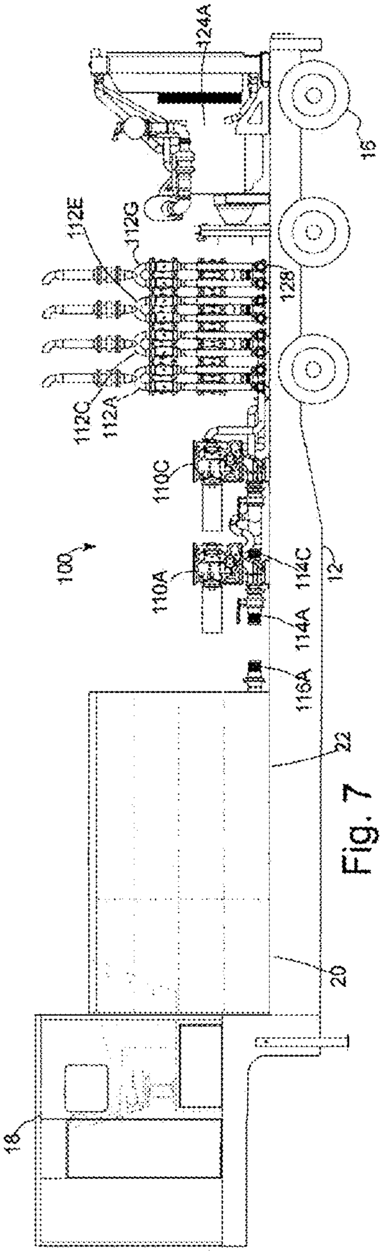
FIG. 7 is a side view of an embodiment of the pig pumping unit of FIG. 6.

FIG. 6 shows a top view of an overall arrangement of an example pig pumping unit 100 using hydraulic pumping units. FIG. 7 shows a side view of the embodiment shown in FIG. 6. This example embodiment uses hydraulic motors that can operate at 4600 rpm, and uses water pumps that also operate at 4600 rpm, so no gearboxes are used. As with the first set of embodiments, the hydraulic pig pumping unit 100 may be arranged on a single trailer 12. The wheels 16, operator's cabin 18, dirty water tank 20 and clean water tank 22 may be as shown and described in relation to the above embodiments. A first drive unit 124A and a second hydraulic drive unit 124B are located above wheels 16 in this embodiment. In these figures, the hydraulic circuits, hydraulic motors, and bypass valves are not shown. The embodiment shown has 8 pumps 120A-120H respectively connected to supply water from clean water tank 22 to valve bank portions 112A-112H which each form part of a respective pig pumping circuit. The pumps are connected to the clean water tank 22 by hoses (not shown) connecting pump suction connections 114A-H with clean water tank hose connections 116A-H. At the bottom of the valve banks there are sideways pointing openings 128 which connect to external piping to complete the pig pumping circuits. There may be hatches 126 providing access to the water tanks.

Figure 8:
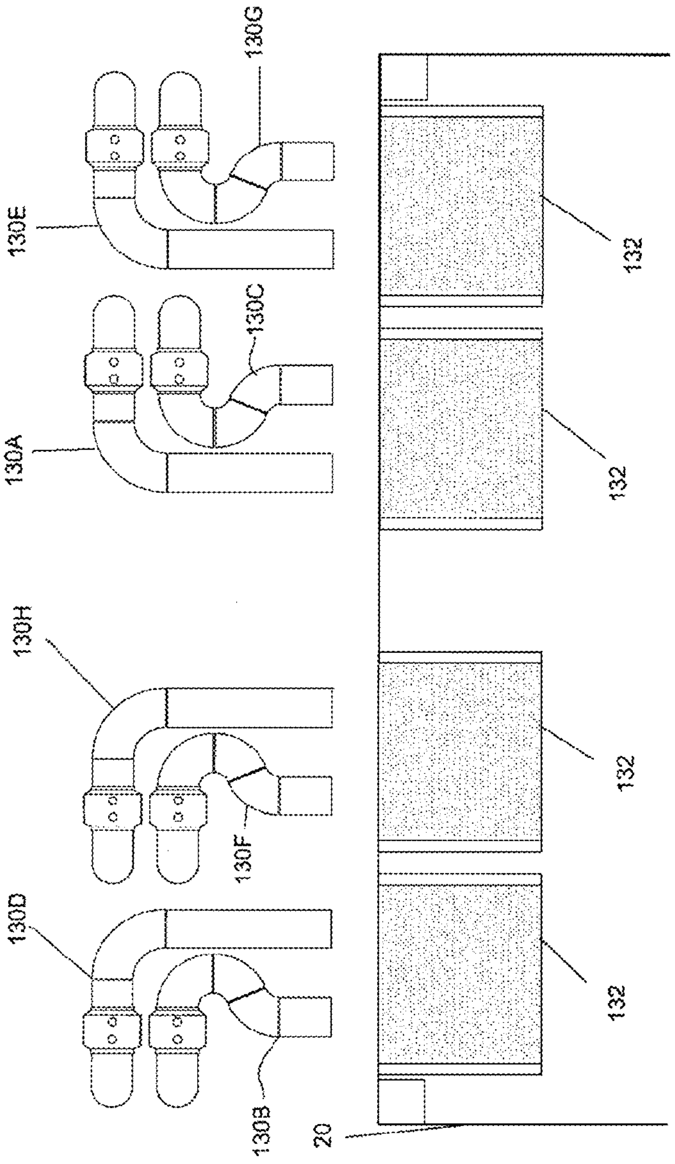
FIG. 8 is a forward view (forward being the direction of the control cabin) of diverters for dumping dirty water for the embodiment of FIG. 6.

The top end of each valve bank portion in the embodiment shown in FIG. 6 connects via a respective pipe (not shown) to a respective diverter 130A-130H which dumps water into the dirty water tank 20 via filter baskets 132, as shown in FIG. 8.

Immaterial modifications may be made to the embodiments described here without departing from what is covered by the claims.

What is claimed is:

1. A pig pumping unit, comprising:

at least a first engine;

a first gearbox connected to the first engine;

at least a first pump, a second pump and a third pump connected to and driven by the first gearbox;

one or more clean water tanks;

one or more dirty water tanks; and at least a first pumping circuit fluidly connected to the first pump, a second pumping circuit fluidly connected to the second pump and a third pumping circuit fluidly connected to the third pump, wherein each pumping circuit is fluidly connected to the clean water tank and dirty water tank.

2. The pig pumping unit of claim 1 further comprising a fourth pump connected to and driven by the first gearbox, and a fourth pumping unit fluidly connected to the first pump and fluidly connected to the clean water and dirty water tank.

* * * * *